United States Patent
Schmidt

(10) Patent No.: US 11,378,555 B2
(45) Date of Patent: Jul. 5, 2022

(54) FLUID ANALYZER

(71) Applicant: Siemens Aktiengesellschaft, Munich (DE)

(72) Inventor: Glen Eugene Schmidt, Bartlesville, OK (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 312 days.

(21) Appl. No.: 16/585,025

(22) Filed: Sep. 27, 2019

(65) Prior Publication Data

US 2020/0103378 A1   Apr. 2, 2020

(30) Foreign Application Priority Data

Sep. 28, 2018 (EP) .................... 18197631

(51) Int. Cl.
*G01N 30/30* (2006.01)
*G01N 30/86* (2006.01)
(Continued)

(52) U.S. Cl.
CPC ......... *G01N 30/30* (2013.01); *G01N 30/8675* (2013.01); *H01C 3/00* (2013.01);
(Continued)

(58) Field of Classification Search
CPC ............................ G01N 30/30; G01N 30/8675
See application file for complete search history.

(56) References Cited

U.S. PATENT DOCUMENTS

| | | | |
|---|---|---|---|
| 3,440,397 A * | 4/1969 | Neer | G05D 23/24 219/209 |
| 4,286,456 A | 9/1981 | Sisti et al. | |

(Continued)

FOREIGN PATENT DOCUMENTS

| | | |
|---|---|---|
| CN | 1426620 | 6/2003 |
| CN | 102694378 | 9/2012 |

(Continued)

OTHER PUBLICATIONS

Office Action dated Nov. 5, 2021 issued in Chinese Patent Application No. 201910926550.9.
(Continued)

*Primary Examiner* — Paul M. West
*Assistant Examiner* — Mark A Shabman
(74) *Attorney, Agent, or Firm* — Cozen O'Connor

(57) ABSTRACT

A fluid analyzer having an electrical heater includes an intrinsic safety barrier that provides voltage and current from a power source to an electrical load and includes a voltage limiter and an infallible current limiting resistor for limiting the voltage and current provided to respective intrinsically safe levels, where the voltage limiter is arranged in a flameproof/explosion proof or pressurized/purged enclosure, and the current limiting resistor, e.g., an electrical heater, is connected via a connecting line to the voltage limiter and arranged outside the flameproof/explosion proof or pressurized/purged enclosure in an enclosure configured to provide protection against contact and ingress without being flameproof/explosion proof or pressurized/purged.

18 Claims, 3 Drawing Sheets

(51) Int. Cl.
*H01C 3/00* (2006.01)
*G01N 30/02* (2006.01)
(52) U.S. Cl.
CPC ............... *G01N 2030/025* (2013.01); *G01N 2030/3084* (2013.01)

(56) References Cited

U.S. PATENT DOCUMENTS

| | | | |
|---|---|---|---|
| 6,514,316 B1 * | 2/2003 | Gaisford | G01N 30/30 95/87 |
| 2003/0037592 A1 * | 2/2003 | D'Couto | G01N 30/30 73/23.35 |
| 2004/0080890 A1 | 4/2004 | Ramsay et al. | |
| 2011/0006202 A1 | 1/2011 | Correale | |
| 2012/0243138 A1 | 9/2012 | Cerny et al. | |
| 2016/0266034 A1 | 9/2016 | Helbley et al. | |

FOREIGN PATENT DOCUMENTS

| | | |
|---|---|---|
| CN | 106841456 | 6/2017 |
| CN | 107532998 | 1/2018 |
| EP | 2273531 | 1/2011 |
| JP | H0448259 | 2/1992 |
| JP | 2007336688 A * | 12/2007 |
| WO | WO 01/82442 | 11/2001 |

OTHER PUBLICATIONS

Wu "Electrical Insulating Material Science and Engineering," Xi'an Jiaotong University Press, p. 373, Aug. 1, 1996.

* cited by examiner

FLUID ANALYZER

BACKGROUND OF THE INVENTION

1. Field of the Invention

The invention relates to analyzers and, more particularly, to a fluid analyzer for uses in a hazardous area.

2. Description of the Related Art

A fluid analyzer typically has a fluid analysis section for receiving fluid (or a fluid sample) to be analyzed and for measuring a physical and/or chemical property of the fluid. Such properties include, among others, thermal conductivity, wavelength specific optical absorption or, e.g., in the case of oxygen, magnetic susceptibility, and may be measured directly by suitable sensors or detectors. Some properties may be also measured indirectly, such as the optical absorption that in non-dispersive infrared (NDIR) gas measurement is often detected by opto-pneumatic detectors. Chromatographic equipment is commonly used for separating complex fluid mixtures into their individual components, so that the individual components can be precisely measured. The fluid analysis section is controlled by an electronics section that also serves for processing the measurement values obtained from the fluid analysis section to generate analytical measuring data based thereon. Such analytical measuring data may comprise the concentrations of individual components of the fluid.

The fluid analysis section (or parts of it) is often equipped with an electrical heater. In gas analysis, for example, heating of the gas-carrying parts in the fluid analysis section may be provided to prevent condensation of moisture contained in the gas. There are also analyzers comprising sensors, such as gas sensors based on semiconductor metal oxides, which need to be heated in order to be able to perform meaningful measurements. In gas chromatographs, heating of separating columns is often necessary to achieve the desired separation properties, or the sample to be analyzed is a liquid that needs to be evaporated before it enters the separating column. Not at least, because conventional gas analysis methods are generally temperature-sensitive, the influence of external temperature can be reduced by heating the analyzer or the analysis section, thus obtaining reproducible, stable measuring results.

Fluid analyzers, in particular gas analyzers, are often located in a harsh environment where explosive gases may be present. Thus, safety precautions must be taken to prevent the gases from igniting. To that end, the analyzer or affected parts of it may be arranged in a pressurized enclosure that uses overpressure to prevent an explosive atmosphere from entering. The overpressure may be maintained by continuous purging, which can be costly. In flameproof (or explosion-proof) enclosure protection, an explosion occurring inside the enclosure is prevented from spreading and igniting the explosive atmosphere surrounding the enclosure. This, however, leads to very robust and expensive housings.

Purged enclosures and explosion-proof devices/enclosures, alone or in combination, may also cause a significant heat problem. On the one hand, larger amounts of heat from electrical equipment inside the enclosure cannot be sufficiently removed simply through convection. On the other hand, fan cooling is not possible because any attempt to bring cooling air into the enclosure would instead bring explosive gases into the enclosure and cause a hazardous condition.

The thermal problem is exacerbated if, as mentioned above, the fluid analyzer is equipped with an electrical heater. This applies in particular to a gas chromatograph which includes an oven containing the one or more chromatographic columns and detectors. This oven, with components that can easily exceed ignition temperatures of gases present in the area, must then be contained in an explosion proof housing, making it hard to service, or be purged by an uninterruptible air source, which is not always readily available.

Another explosion protection technique is an intrinsically safe protection that is applied to electrical equipment and wiring to limit both electrical and thermal energy under normal or abnormal conditions to levels that are insufficient to ignite the explosive atmosphere in the hazardous area. There are various intrinsic safety standards set forth by various certifying agencies including International Electrical Commission (IEC) IEC 60079-11, Factory Mutual (FM) 3610, Underwriters Laboratories (UL) UL913, etc. In many cases, intrinsically safe equipment in a hazardous area must be connected to non-intrinsically safe equipment located in a non-hazardous area or in enclosures rated for the hazardous area. In these cases, the intrinsically safe equipment and non-intrinsically safe equipment are connected through an intrinsic safety barrier, which is typically located at a border of a hazardous area and non-hazardous area or within an explosion proof or purged enclosure in the hazardous area.

In order to provide voltage and current from the non-intrinsically safe equipment (power source) to the intrinsically safe equipment (electrical load), the intrinsic safety barrier typically includes a voltage limiter (e.g., zener diodes or crowbar circuits) and a current limiting resistor for limiting both the voltage and current provided to respective intrinsically safe levels.

US 2004/0080890 A1 discloses a safety barrier with a voltage limiter in a safe area and current limiting resistors in a hazardous area. The current limiting resistors are arranged in a "suitable protected enclosure" and connected to the voltage limiter via a power line that has a suitable protection, such as an explosion proof cladding.

While all other explosion protection methods require suitable enclosures, conduit and seals, intrinsically safe equipment can simply be wired direct and live without explosion concerns. The user can, in most cases, disconnect or connect a device without removing power from the system. Thus, staying with the example of the oven of a gas chromatograph, it would seem that a simple solution to the concerns noted above would be to use intrinsic safety barriers to provide power to the oven. According to the maximum power transfer theorem, however, an electrical load will receive maximum power from a power source when its resistor is equal to the internal resistance of the power source. Thus, when maximizing power utilization, the current limiting resistor will dissipate the same power (i.e., heat) as the electrical load, which will quickly become a thermal problem for the device containing the intrinsic safety barrier. In the case of the gas chromatograph mentioned, it would not make sense to provide a heater system that heats the electronics enclosure as much or more than the oven it is controlling.

SUMMARY OF THE INVENTION

In view of the foregoing, it is therefore an object of the present invention to provide an improved heating concept for an electrically heated fluid analyzer to be used in a hazardous area.

This and other objects and advantages are achieved in accordance with the invention by a fluid analyzer comprising: a fluid analysis section configured to receive fluid and measures a physical and/or chemical property of the fluid, when the fluid analysis section being equipped with an electrical heater; an electronics section configured to at least one of control the fluid analysis section and process measurement values delivered by the fluid analysis section so as to generate analytical measuring data based thereon; and an intrinsic safety barrier configured to provide voltage and current from a power source to an electrical load and comprising a voltage limiter and an infallible current limiting resistor for limiting the voltage and current provided to respective intrinsically safe levels, wherein the voltage limiter is arranged in a flameproof/explosion proof or pressurized/purged enclosure, the current limiting resistor is connected via a connecting line to the voltage limiter and arranged outside the flameproof/explosion proof or pressurized/purged enclosure in an enclosure configured to provide protection against ingress without being flameproof/explosion proof or pressurized/purged, and the current limiting resistor is configured to constitute the electrical heater.

In contrast to the current limiting resistor, the voltage limiter generates very little heat in normal operation and thus does not cause thermal problems in the flameproof/explosion proof or pressurized/purged enclosure. As the current limiting resistor is physically separated from the enclosure, it does not add heat to the electronics in the enclosure, thus assisting in a higher ambient temperature capability. Instead, the heat generated by the current limiting resistor may be advantageously used in cases where the fluid analysis section of the fluid analyzer is equipped with an electrical heater. For this, the current limiting resistor may be designed to constitute the electrical heater.

Thus, an idea of the invention is to depart from the traditional concept of a separate safety barrier and load, and to use the current limiting resistor of the barrier as an additional electrical load that is in series with the electrical load and that may produce useful heat for the fluid analyzer in a hazardous area. Thus, the current limiting resistor (which is the electrical heater) represents a proportion of the overall electrical load, which proportion may amount up to 100 percent. In the latter case, there is no other electrical load than the current limiting resistor, and the electrical load connected to the current limiting resistor is reduced to a short circuit connecting the current limiting resistor to ground or return path.

In the more general case, at least one of electrical components of the fluid analysis section and/or electrical assemblies of the electronics section is connected to the intrinsic safety barrier to constitute the electrical load. Such electrical components may include one or more further electrical heaters which, individually or together, are series connected to the electrical heater that is formed by the current limiting resistor.

As already mentioned, the fluid analysis one section of a gas chromatograph typically comprises at least separation device (e.g., one or more chromatographic columns) operable to separate components of a sample gas and a detector (e.g., thermal conductivity detectors) operable to detect separated components eluting from an output of the separation device. The separation device and, if appropriate, the detector may be placed in an intrinsically safe oven that has internal electrical heating. In this case, the intrinsic safety barrier may be used to provide power to the oven with the electrical heater (formed by the current limiting resistor) being provided on an outer side of the oven and the internal heating of the oven constituting the load (in the traditional sense). Thus, the electrical heater or current limiting resistor serves as an auxiliary heating that removes most of the ambient temperature effects on the internal (or main) heating of the oven and allows for controlling the final column and detector temperature to a very stable value.

If the safety requirements can be met, the oven itself may be heated as the current limiting resistor.

In all cases, it is important that both the electrical heater formed by the current limiting resistor and the connecting line between it and the voltage limiter of the safety barrier are configured to be infallible in accordance with intrinsic safety standards. The limiting resistor must be a film resistor or a wirewound resistor or may be just a resistive metallic conductor, such as wire, in order to be considered infallible. Physical separation (creepage and clearance) requirements must be followed to meet safety standards. Clearance is the shortest distance in air between two conductive parts. Creepage distance means the shortest distance along the surface of a solid insulating material between two conductive parts. Any wiring must be insulated by solid insulation of minimum thickness of encapsulation or minimum distance of spacing through the air. The user must not be able to access the wiring, i.e., there must be a certain Ingress Protection (IP) level. The IP Code, International Protection Marking, IEC standard 60529, sometimes interpreted as Ingress Protection Marking, classifies and rates the degree of protection provided against intrusion (body parts such as hands and fingers), dust, accidental contact, and water by mechanical casings and electrical enclosures. The foregoing applies to both the electrical heater formed by the current limiting resistor and the connecting line between it and the voltage limiter.

With regard to a wire-shaped current limiting resistor, the wire may have a hollow core instead of a solid core so that the surface area for heating is increased while holding a suitable minimum resistance. This also prevents the surface of the wire from exceeding the Temperature Classification Rating (T-code) for the hazardous area in which the equipment is installed. This addresses the fact that all flammable gases have a temperature at which they will ignite, without any spark. The equipment cannot be allowed to exceed this temperature. The increased surface area of the hollow tube presents the same heat, but at a lower surface temperature than a solid wire of the same resistance. The wire further may be made of a temperature-stabilized alloy, such as Constantan or Manganin, or made of steel, in particular stainless steel, because of its high resistivity. The hollow wire may be used to transport and heat the fluid to be analyzed, or it may be adapted to accommodate a chromatographic separation column.

In order to reach maximum power utilization, the electrical load may be selected such that its resistance is equal to the resistance of the current limiting resistor. This would allow for half of the energy to go to the electrical heater or current limiting resistor and the other half to be used for other intrinsically safe devices that are part of the overall fluid analyzer.

The heat generating current limiting resistor is outside the enclosure in which the voltage limiter is located. As a result, as many parallel intrinsically safe circuits (including current limiting resistors and the respective loads connected thereto) can be used, as long as they follow the rules of intrinsic safety standards, particularly, as long as proper separation between said parallel intrinsically safe circuits is assured. Thus, the intrinsic safety barrier may be adapted to provide the voltage and one or more additional currents from the power source to one or more additional electrical loads through respective additional connecting lines and current limiting resistors. Depending on whether and what amount of useful heat is needed, none, some or all of the additional current limiting resistors may be configured and arranged to form additional electrical heaters.

There is no need for multiple line feedthroughs for the transfer of the electrical currents from the voltage limiter in the enclosure to the current limiting resistors outside, where each of the line feedthroughs must be flameproof. Instead, a single cable may lead from the voltage limiter into a junction box from which the cable splits to the current lines. Any current limiting resistor that is not used to generate and transfer useful heat may be located in the junction box.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described by way of example and with reference to the accompanying drawing, in which.

DETAILED DESCRIPTION OF THE EXEMPLARY EMBODIMENTS

Figure 1:
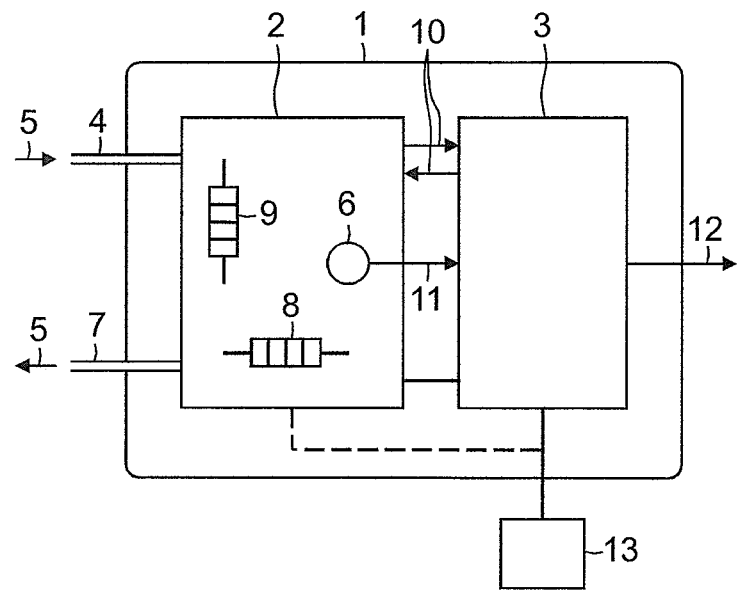
FIG. 1 is a simplified schematic block diagram of a fluid analyzer having a fluid analysis section and an electronics section in accordance with the invention.

In the figures, identical or similar parts or components with the same or similar functions are provided with the same reference numerals.

FIG. 1 is a simplified schematic block diagram of a fluid analyzer 1 that includes a fluid analysis section 2 and an electronics section 3. The fluid analysis section 2 has a fluid inlet 4 for receiving a stream or sample of a fluid (gas or liquid) 5 and at least one sensor or detector 6 for measuring a physical and/or chemical property of the fluid 5. Such properties may include, among others, thermal conductivity, wavelength specific optical absorption, chemiluminescence, UV fluorescence or magnetic susceptibility of, e.g., oxygen. In order to analyze complex fluid mixtures, the fluid analysis section 2 may include chromatographic equipment for separating the fluid mixture into its components that then can be individually measured. After having been measured, the fluid 5 exits the fluid analysis section 2 through a fluid outlet 7.

For the variety of reasons already discussed above, the fluid analysis section 2 (or parts of it) is equipped with an electrical heater 8 and, if necessary, one or more further or additional electrical heaters 9.

The fluid analysis section 2 is controlled by the electronics section 3 via control lines 10. The electronics section 3 also serves for processing measurement values 11 obtained from the fluid analysis section 2 in order to generate and output analytical measuring data 12 based thereon. Such analytical measuring data may comprise selected concentrations of constituents in a fluid mixture 5. The fluid analysis section 2 and electronics section 3 receive electrical power from a power source 13. The fluid analysis section 2 may be directly or indirectly powered via the electronics section 3, as shown in this illustration.

It should be noted that the differentiation between the fluid analysis section 2 and the electronics section 3 is rather functional than structural, which means that the electrical components of the fluid analysis section 2 and the electrical assemblies 3 of the electronics section are not necessarily placed in strictly separate areas of the fluid analyzer 1.

Figure 2:
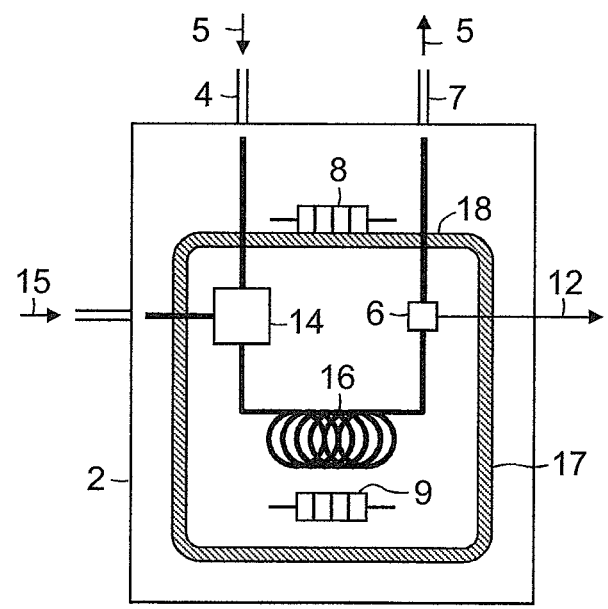
FIG. 2 is an embodiment of the fluid analysis section of a gas chromatograph in accordance with the invention.

FIG. 2 schematically illustrates an embodiment of the fluid analysis section 2 of a gas chromatograph. A sample of the gas mixture 5 is supplied to a dosing unit 14 for injecting a specified dose of the gas sample into a carrier gas stream 15, such as hydrogen, nitrogen or helium. The carrier gas 15 carries the sample through a separation device 16, such as one or several separation columns, where separation of the components of the gas mixture 5 occurs. The gas components successively eluting from the separation device 16 are detected and quantitatively identified by the at least one detector 6, e.g., a thermal conductivity detector. The separation device 16 and, where applicable, also the dosing unit 14 and/or detector 6 are located in an oven 17 that has an internal (or main) heating constituted by the further electrical heater 9. The electrical heater 8 serves as an auxiliary heating and is placed on an outer side 18 of the oven 17, e.g., on or in an outer baseplate.

Figure 3:
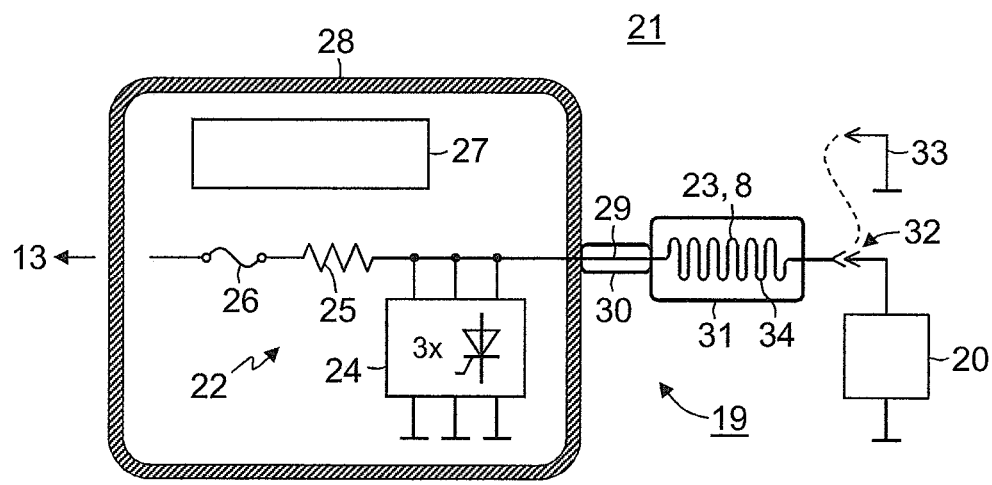
FIG. 3 is an embodiment of an intrinsic safety barrier provide voltage and current to an electrical load in accordance with the invention.

FIG. 3 exemplarily depicts an intrinsic safety barrier 19 adapted to provide voltage and current from the power source 13 to an electrical load 20. The electrical load 20 may be any of the electrical components of the fluid analysis section 2 and/or electrical assemblies of the electronics section 3 that are not protected by, e.g., a purged or explosion-proof enclosure and need to be rated intrinsically safe for use in a hazardous area 21. In the case of the gas chromatograph of FIG. 2, such electrical components may include, for example, electromagnetic valves for, e.g., regulating the flow of the carrier gas 15, thermal conductivity detectors 6 and their electronics for detecting gas components eluting from the separation device 16 or the electrically heated oven 17. The intrinsic safety barrier 19 includes a voltage limiter 22 and a current limiting resistor 23 for limiting the voltage and current provided to respective intrinsically safe levels. The voltage limiter 22 typically includes parallel (i.e. redundant) zener diodes or crowbar circuits 24, a resistor 25 and a fuse 26. The zener diodes or crowbar circuits 24 function to clamp over voltages, so that in the event of over voltage conditions, the fuse 26 will blow because of excessive current.

The voltage limiter 22 and (optionally) other electrical or electronic equipment 27 may be located in a non-hazardous area or, as illustrated here, in a purged or flameproof enclosure 28 rated for the hazardous area 21. Though being a functional part of the intrinsic safety barrier 19, the current limiting resistor 23 is arranged outside the enclosure 28 and connected via a connecting line 29 to the voltage limiter 22.

Both the current limiting resistor 23 which, in the illustrated example, is a wirewound resistor, and the connecting line 29 must be established to be infallible in accordance with intrinsic safety standards. Thus, any wiring must be insulated by solid insulation of, e.g., 0.5 to 1 mm, encapsulation thickness of 0.5 to 2 mm or 6 mm distance of spacing through the air (the dimensions given depending on the voltages of the system). The wirewound resistor 23 may require similar separation. Furthermore, the user must not be able to access the resistive section of the wiring. To that end, the connecting line 29 and the limiting resistor 23 may be surrounded by enclosures 30, 31 that provide a certain Ingress Protection (IP) level, such as IP45, but neither need to be nor are flameproof/explosion proof or pressurized/purged. The connecting line 29 can have varying installation distances and may be installed with accepted practices and applicable codes for the country and hazardous-area rating where it is put into use (Zones or Divisions). This, for example, may be metal conduit and poured seals in North America (Divisions) and insulated wiring and cable glands with an approved Increased Safety Installation in Europe and other worldwide locations that use Zones.

In contrast to previous safety concepts, the current limiting resistor 23 is used as an additional electrical load that is in series with the electrical load 20 to be powered and which forms the electrical heater 8 thus producing useful heat for the fluid analyzer 1 in the hazardous area 21. To reach maximizing power utilization, the electrical load 20 may be selected such that its resistance is equal to the resistance of the current limiting resistor 23. Here, half of the energy will be converted by the electrical heater 8 or current limiting resistor 23 into useful heat, whereas the other half is used for other intrinsically safe components or assemblies 20 of the fluid analyzer 1. In contrast to the current limiting resistor 23, the voltage limiter 22 generates very little heat and thus does not cause thermal problems in the flameproof/explosion proof or pressurized/purged enclosure 28. This holds in particular true if, instead of a zener barrier, a crowbar circuit is used, which dissipates almost no power in normal operation and only an insignificant amount of power while activated. As the current limiting resistor 23 is physically separated from the enclosure 28, it does not add heat to the electronics in the enclosure 28, thus assisting in a higher ambient temperature capability.

As the energy available past the electrical heater 8 or current limiting resistor 23 is entirely intrinsically safe, the load 20 or any other load may be connected to or disconnected from the current limiting resistor 23 using detachable connectors 32 at any time and without concern with hazardous area conditions. The energy provided may be completely converted into useful heat. Here, a further or additional electrical heater 9 (see FIGS. 1 and 2) may be used as the electrical load 20. Alternatively, a short circuit 33 may be used to connect the current limiting resistor 23 to ground (or power return) so that all of the available heater power is delivered to the electrical heater 8 or current limiting resistor 23.

The wire 34 of the wirewound resistor 8, 23 may be made of steel or a temperature stabilized alloy and may have a hollow core instead of a solid core so that the surface area for heating is increased.

Figure 4:
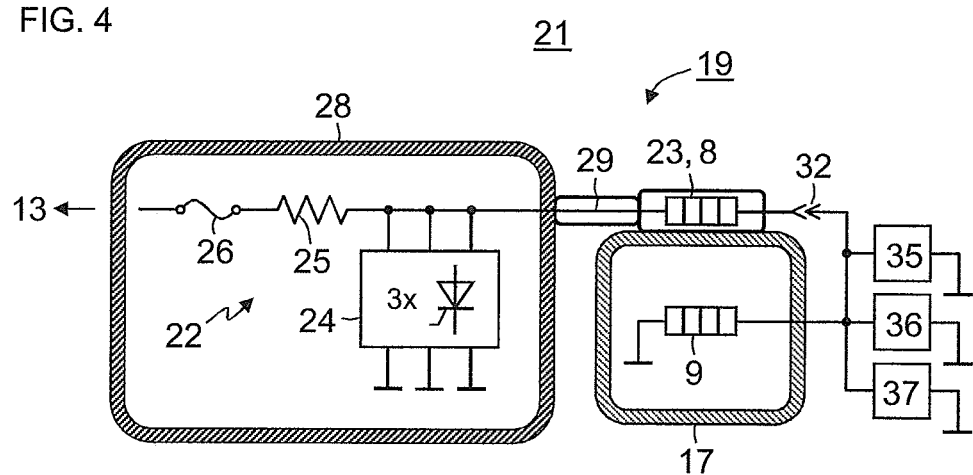
FIG. 4 is an embodiment of the intrinsic safety barrier where electrical load is an oven of a gas chromatograph in accordance with the invention.

FIG. 4 illustrates an embodiment of the intrinsic safety barrier 19 where electrical load 20 comprises the oven 17 of a gas chromatograph, or more precisely, its internal heating constituted by the further electrical heater 9 (see FIG. 2) and optionally further electrical components 35, 36, 37 of the gas chromatograph, in particular of the fluid analysis section 2. The intrinsically safe components may include a gas pressure controller 35, a heating controller 36 and detector electronics 37.

Figure 5:
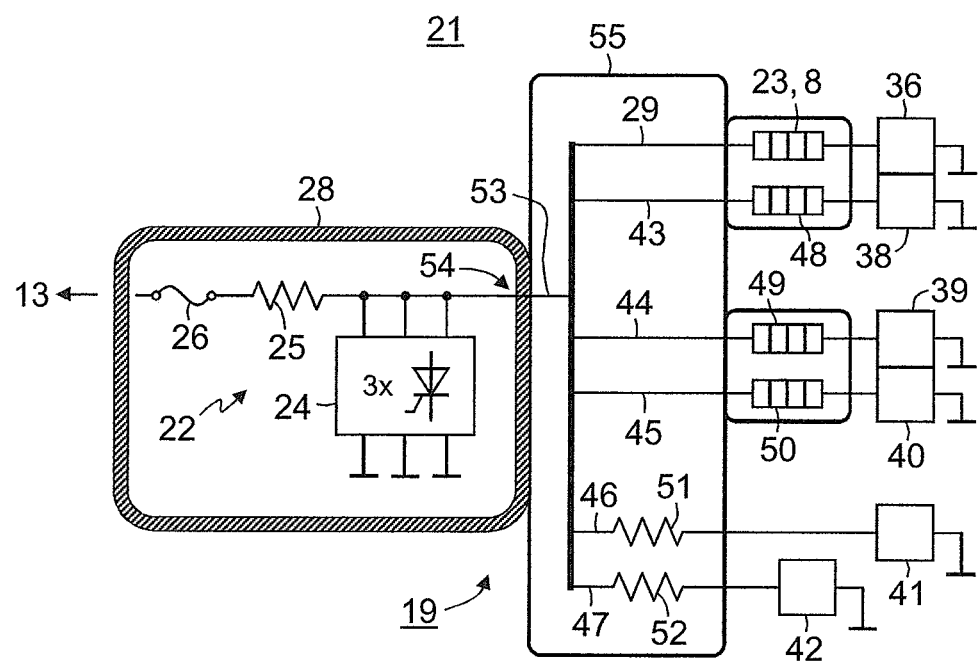
FIG. 5 is an embodiment of the intrinsic safety barrier providing voltage and currents to many parallel intrinsically safe circuits in accordance with the invention.

FIG. 5 demonstrates the flexibility of the new safety concept. The purged or flameproof enclosure 28 only contains the voltage limiting part of the intrinsic safety barrier 19. Consequently, the current capacity can be such that many parallel intrinsically safe circuits can be used, as long as they follow the rules of intrinsic safety standards, i.e., as long as proper separation is assured. In the illustrated example, the intrinsic safety barrier 19 provides the voltage and additional currents from the power source 13 to additional electrical loads 38, 39, 40, 41, 42 through respective additional connecting lines 43, 44, 45, 46, 47 and current limiting resistors 48, 49, 50, 51, 52. As well as the current limiting resistor 23, the additional current limiting resistors 48, 49, 50 are established and arranged to form additional electrical heaters.

To avoid multiple flameproof line feedthroughs in the enclosure 28, a single cable 53 may lead from the voltage limiter 22 through a single feedthrough 54 into a junction box 55 from which the cable 53 splits to the connecting lines 29, 43-47. Any current limiting resistor 51, 52 that is not used to generate and transfer useful heat may be located in the junction box 55 so that they are physically separated from the enclosure 28 and do not add heat to the electronics therein. The junction box 55 is neither flameproof/explosion proof nor pressurized/purged but provides ingress protection.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fluid analyzer comprising:
   a fluid analysis section configured to receive a fluid and to measure at least one of a physical and chemical property of said fluid, the fluid analysis section being equipped with an electrical heater;
   an electronics section configured to at least one of control the fluid analysis section and process measurement values delivered by the fluid analysis section to generate analytical measuring data based thereon; and
   an intrinsic safety barrier configured to provide voltage and current from a power source to an electrical load, said intrinsic safety barrier comprising a voltage limiter and an infallible current limiting resistor for limiting the voltage and current provided to respective intrinsically safe levels;
   wherein the voltage limiter is arranged in one of a flameproof/explosion proof and pressurized/purged enclosure;

wherein the current limiting resistor is connected via a connecting line to the voltage limiter and arranged outside one of the flameproof/explosion proof and the pressurized/purged enclosure in an enclosure established to provide protection against ingress without being one of flameproof/explosion proof and pressurized/purged; and wherein the current limiting resistor forms a further electrical heater.

2. The fluid analyzer of claim 1, wherein the current limiting resistor is of a wire-shaped type or wirewound type and is made of steel.

3. The fluid analyzer of claim 2, wherein the current limiting resistor in made of one of stainless steel and alloys.

4. The fluid analyzer of claim 3, wherein the electrical load is a short circuit.

5. The fluid analyzer of claim 2, wherein the current limiting resistor is of a hollow wire type.

6. The fluid analyzer of claim 2, wherein the electrical load is a short circuit.

7. The fluid analyzer claim 2, wherein the intrinsic safety barrier is configured to provide a voltage and at least one further current from the power source to at least one additional electrical load, said intrinsic safety barrier comprising at least one additional current limiting resistor for limiting a respective additional current to an intrinsically safe level, said at least one additional current limiting resistor being connected to the voltage limiter via a respective additional connecting line.

8. The fluid analyzer of claim 7, wherein at least one current limiting resistor of additional current limiting resistors is configured and arranged to form an additional electrical heater.

9. The fluid analyzer of claim 8, further comprising:
a single cable leading from the voltage limiter into a junction box to split to the connecting line and the at least one additional connecting line.

10. The fluid analyzer of claim 9, wherein at least one current limiting resistor of additional current limiting resistors, which does not form an additional electrical heater, is located in the junction box.

11. The fluid analyzer of claim 7, further comprising:
a single cable leading from the voltage limiter into a junction box to split to the connecting line and the at least one additional connecting line.

12. The fluid analyzer of claim 11, wherein at least one current limiting resistor of additional current limiting resistors, which does not form an additional electrical heater, is located in the junction box.

13. The fluid analyzer of claim 1, wherein the electrical load is a short circuit.

14. The fluid analyzer of claim 1, wherein at least one electrical component of at least one of (i) the fluid analysis section and (ii) an electrical assembly of the electronics section is connected to the intrinsic safety barrier as the electrical load.

15. The fluid analyzer of claim 14, wherein a resistance of the current limiting resistor is equal to a resistance of the electrical load.

16. The fluid analyzer of claim 15, wherein at least one electrical component of said electrical components of the fluid analysis section is the further electrical heater arranged in the fluid analysis section.

17. The fluid analyzer of claim 14, wherein at least one electrical component of said electrical components of the fluid analysis section is the further electrical heater arranged in the fluid analysis section.

18. The fluid analyzer of claim 1, wherein the fluid analyzer comprises a gas chromatograph having a fluid analysis section which comprises:
a separation device operable to separate components of a sample gas;
a detector device operable to detect separated components eluting from an output of the separation device; and
an intrinsically safe oven which includes an internal electrical heating and in which the separation device are placed;
wherein the electrical heater is provided on an outer side of the oven and the internal heating of the oven is constituted by the further electrical heater.

* * * * *